(12) United States Patent
Maletsky

(10) Patent No.: US 10,474,823 B2
(45) Date of Patent: **\*Nov. 12, 2019**

(54) CONTROLLED SECURE CODE AUTHENTICATION

(71) Applicant: Atmel Corporation, San Jose, CA (US)

(72) Inventor: Kerry David Maletsky, Monument, CO (US)

(73) Assignee: Atmel Corporation, San Jose, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 15/044,770

(22) Filed: Feb. 16, 2016

(65) Prior Publication Data

US 2017/0235957 A1    Aug. 17, 2017

(51) Int. Cl.
*G06F 21/57* (2013.01)
*G06F 21/44* (2013.01)
(Continued)

(52) U.S. Cl.
CPC ............ *G06F 21/575* (2013.01); *G06F 21/44* (2013.01); *G06F 21/57* (2013.01); *G06F 21/602* (2013.01);
(Continued)

(58) Field of Classification Search
CPC ....... H04L 63/08; H04L 63/0428; H04L 9/08; H04L 9/32; H04L 9/3271; H04L 63/0807;
(Continued)

(56) References Cited

U.S. PATENT DOCUMENTS 5,422,632 A * 6/1995 Bucholtz ................ B60R 25/04
307/10.3
6,212,635 B1   4/2001 Reardon
(Continued)

OTHER PUBLICATIONS

Edman, Matthew, 'Cryptographic Security in Wireless Networks Via Physical Layer Properties,' Doctoral Dissertation, Rensselaer Polytechnic Institute, May 2011, 141 pages.
(Continued)

*Primary Examiner* — Farid Homayounmehr
*Assistant Examiner* — Sanchit K Sarker
(74) *Attorney, Agent, or Firm* — Fish & Richardson P.C.

(57) ABSTRACT

Systems, methods, circuits and computer-readable mediums for controlled secure code authentication are provided. In one aspect, a non-transitory computer-readable storage medium having instructions stored thereon which, when executed by one or more processors, cause the one or more processors to perform a method including: sending a request to a client device, the request including a challenge for a property of a particular portion from among a plurality of portions of code stored within the client device, the challenge including data indicating a particular memory address range corresponding to the particular portion of the code, receiving a response to the request from the client device, the response including information associated with the property of the code, verifying correctness of the response based on the received information, and based on verifying correctness of the response, determining that the code is an authorized code.

26 Claims, 6 Drawing Sheets

(51) Int. Cl.

| | | |
|---|---|---|
| G06F 21/60 | (2013.01) | |
| G06F 21/64 | (2013.01) | |
| H04L 9/30 | (2006.01) | |
| H04L 9/32 | (2006.01) | |
| H04L 29/06 | (2006.01) | |

(52) U.S. Cl.
CPC ............ *G06F 21/64* (2013.01); *H04L 9/3066* (2013.01); *H04L 9/3239* (2013.01); *H04L 9/3242* (2013.01); *H04L 9/3247* (2013.01); *H04L 9/3271* (2013.01); *H04L 63/0807* (2013.01); *H04L 63/0876* (2013.01); *G06F 2221/033* (2013.01); *G06F 2221/2129* (2013.01)

(58) Field of Classification Search
CPC . H04L 9/3239; H04L 63/0876; H04L 9/3242; H04L 9/3247; H04L 9/3066; G06F 21/575; G06F 21/57; G06F 21/602; G06F 21/44; G06F 21/64; G06F 2221/2129; G06F 2221/033
See application file for complete search history.

(56) References Cited

U.S. PATENT DOCUMENTS

| | | | |
|---|---|---|---|
| 6,601,172 | B1 | 7/2003 | Epstein |
| 6,704,871 | B1 | 3/2004 | Kaplan et al. |
| 6,708,273 | B1 | 3/2004 | Ober et al. |
| 6,826,690 | B1 | 11/2004 | Hind |
| 6,886,745 | B2 * | 5/2005 | Berrube ................ G06F 3/147 235/375 |
| 6,961,858 | B2 | 11/2005 | Fransdonk |
| 6,996,710 | B1 | 2/2006 | Ellison et al. |
| 7,142,674 | B2 | 11/2006 | Brickell |
| 7,165,181 | B2 | 1/2007 | Brickell |
| 7,213,149 | B2 | 5/2007 | Mache |
| 7,369,856 | B2 | 5/2008 | Ovadiam |
| 7,430,668 | B1 | 9/2008 | Chen et al. |
| 7,584,359 | B2 | 9/2009 | Karaoguz et al. |
| 7,596,812 | B2 | 9/2009 | Li |
| 7,685,263 | B2 | 3/2010 | Redjaian et al. |
| 7,716,497 | B1 | 5/2010 | Trimberger |
| 7,822,204 | B2 | 10/2010 | Yoshida et al. |
| 8,165,301 | B1 | 4/2012 | Bruce et al. |
| 8,321,680 | B2 | 11/2012 | Gantman et al. |
| 8,347,374 | B2 * | 1/2013 | Schneider ............ G06F 21/305 726/12 |
| 8,555,072 | B2 | 10/2013 | Camenisch et al. |
| 9,106,479 | B1 | 8/2015 | Mukerji |
| 9,118,469 | B2 | 8/2015 | Maletsky et al. |
| 9,323,950 | B2 | 4/2016 | Maletsky et al. |
| 2002/0026578 | A1 | 2/2002 | Hamann et al. |
| 2003/0046542 | A1 * | 3/2003 | Chen .................... G06F 21/445 713/176 |
| 2003/0093663 | A1 | 5/2003 | Walker |
| 2003/0138105 | A1 | 7/2003 | Challener et al. |
| 2003/0140238 | A1 * | 7/2003 | Turkboylari .......... G06F 21/575 713/193 |
| 2004/0101141 | A1 | 5/2004 | Alve |
| 2004/0216150 | A1 * | 10/2004 | Scheifler ................ G06F 21/57 719/330 |
| 2005/0005097 | A1 | 1/2005 | Murakawa |
| 2005/0066354 | A1 * | 3/2005 | Dellow ............... G06F 12/1483 725/30 |
| 2005/0122995 | A1 * | 6/2005 | Meyer .................. H04L 69/326 370/473 |
| 2006/0098824 | A1 | 5/2006 | Mao |
| 2006/0101288 | A1 | 5/2006 | Smeets et al. |
| 2006/0122937 | A1 | 6/2006 | Gatto et al. |
| 2006/0161761 | A1 * | 7/2006 | Schwartz ............... G06F 21/52 711/216 |
| 2006/0218649 | A1 | 9/2006 | Brickell et al. |
| 2006/0282901 | A1 | 12/2006 | Li et al. |
| 2007/0021141 | A1 | 1/2007 | Yokota |
| 2007/0119918 | A1 | 5/2007 | Hogg et al. |
| 2007/0123304 | A1 | 5/2007 | Pattenden et al. |
| 2007/0237366 | A1 | 10/2007 | Maletsky |
| 2008/0263357 | A1 | 10/2008 | Boyen |
| 2008/0287757 | A1 | 11/2008 | Berson et al. |
| 2009/0031141 | A1 | 1/2009 | Pearson et al. |
| 2009/0129600 | A1 | 5/2009 | Brickell et al. |
| 2009/0133113 | A1 * | 5/2009 | Schneider ............ G06F 21/305 726/12 |
| 2009/0144541 | A1 | 6/2009 | Kim et al. |
| 2009/0153901 | A1 | 6/2009 | Imamura et al. |
| 2009/0256717 | A1 | 10/2009 | Iwai |
| 2009/0292931 | A1 * | 11/2009 | Henry .................... G06F 21/72 713/190 |
| 2010/0005318 | A1 | 1/2010 | Hosain |
| 2010/0045232 | A1 | 2/2010 | Chen |
| 2010/0082984 | A1 | 4/2010 | Ellison et al. |
| 2010/0082987 | A1 | 4/2010 | Thom et al. |
| 2010/0088523 | A1 | 4/2010 | Wooten |
| 2010/0130166 | A1 | 5/2010 | Tsuria et al. |
| 2010/0158242 | A1 * | 6/2010 | Asher .................. H04L 9/0643 380/28 |
| 2010/0185864 | A1 | 7/2010 | Gerdes et al. |
| 2010/0203960 | A1 | 8/2010 | Wilson et al. |
| 2011/0099362 | A1 | 4/2011 | Haga et al. |
| 2011/0219427 | A1 | 9/2011 | Hito et al. |
| 2011/0221568 | A1 | 9/2011 | Giobbi |
| 2011/0271099 | A1 | 11/2011 | Preiss |
| 2012/0023568 | A1 | 1/2012 | Cha et al. |
| 2012/0198224 | A1 | 8/2012 | Leclercq |
| 2012/0255027 | A1 * | 10/2012 | Kanakapura ........... G06F 21/51 726/26 |
| 2013/0046547 | A1 | 2/2013 | Drucker et al. |
| 2013/0145151 | A1 | 6/2013 | Brown et al. |
| 2013/0276071 | A1 | 10/2013 | Cen |
| 2013/0276074 | A1 | 10/2013 | Orsini et al. |
| 2014/0025944 | A1 | 1/2014 | Malestsky et al. |
| 2014/0047510 | A1 * | 2/2014 | Belton .................... H04L 9/32 726/4 |
| 2014/0068246 | A1 | 3/2014 | Hartley et al. |
| 2014/0089670 | A1 | 3/2014 | Maletsky et al. |
| 2014/0188949 | A1 * | 7/2014 | Martinez ............. G06F 16/137 707/821 |
| 2014/0281554 | A1 | 9/2014 | Maletsky et al. |
| 2015/0100789 | A1 * | 4/2015 | Born ................. H04L 63/0876 713/170 |
| 2015/0339195 | A1 * | 11/2015 | Yang ................... G06F 11/1441 714/6.12 |
| 2016/0088668 | A1 * | 3/2016 | Kim ...................... H04W 48/16 370/315 |
| 2016/0099814 | A1 * | 4/2016 | Negi ...................... H04L 9/0841 713/171 |
| 2016/0110467 | A1 * | 4/2016 | Hern ...................... G06K 7/1447 235/375 |
| 2016/0156621 | A1 | 6/2016 | Thom et al. |
| 2017/0129457 | A1 * | 5/2017 | Lee ........................ B60R 25/24 |
| 2017/0235956 | A1 * | 8/2017 | Maletsky .............. G06F 21/575 726/1 |
| 2017/0235957 | A1 * | 8/2017 | Maletsky ............... G06F 21/44 713/168 |
| 2017/0272252 | A1 * | 9/2017 | Leggette ............... H04L 9/3242 |
| 2017/0302640 | A1 * | 10/2017 | Maletsky ............. H04L 9/3247 |

OTHER PUBLICATIONS

Boneh, D., Boyen, X., and Shacham, H., "Short Group Signatures", Advances in Cryptology, Crypto 2004, Springer-Verlag, pp. 1-19.

Johnson, D., Menezes, A., and Vanstone, S., "The Elliptic Curve Digital Signature Algorithm (ECDSA)", Jul. 27, 2001, Springer-Verlag 2001, pp. 36-63.

USPTO Non-final Office Action in U.S. Appl. No. 13/628,946, dated Nov. 27, 2013, 12 pages.

Non-final office action for U.S. Appl. No. 13/553,388, dated Mar. 18, 2014, 12 pages.

(56) References Cited

OTHER PUBLICATIONS

Final office action for U.S. Appl. No. 13/628,946, dated Jun. 6, 2014, 15 pages.
Non-Final office action for U.S. Appl. No. 13/628,946 dated Dec. 4, 2014, 15 pages.
Non-Final Office Action for U.S. Appl. No. 13/800,422 dated Oct. 7, 2014, 25 pages.
Final OA for U.S. Appl. No. 13/800,422 dated Jan. 27, 2015, 25 pages.
Final Office Action for U.S. Appl. No. 13/553,388 dated Sep. 30, 2014, 18 pages.
USPTO Final Office Action in U.S. Appl. No. 13/628,946, dated Jun. 25, 2015, 15 pages.
USPTO Notice of Allowance in U.S. Appl. No. 13/800,422, dated Apr. 24, 2015, 19 pages.
How Certificates Work; Updated Mar. 28, 2003; retrieved https://technet.microsoft.com/en-us/library/Cc776447(v=WS.10).aspx. on Jul. 17, 2015.
Lampson et al., "Authentication in Distributed Systems: Theory and Practice," ACM; Trans. Computer Systems 10, 4, Nov. 1992, pp. 265-310.
Non-Final Office Action for U.S. Appl. No. 13/553,388 dated Jul. 24, 2015, 18 pages.
VIPER: Verifying the Integrity of PERipherals Firmware; Yanlin Li et al.; ACM; CCS'11, Oct. 17-21, 2011.
Non-Final office action for U.S. Appl. No. 13/628,946 dated Dec. 1, 2015, 15 pages.
Final office action for U.S. Appl. No. 13/628,946 dated Jul. 18, 2016, 20 pages.

\* cited by examiner

US 10,474,823 B2

CONTROLLED SECURE CODE AUTHENTICATION

TECHNICAL FIELD

This disclosure relates generally to code authentication, particularly to controlled secure code authentication.

BACKGROUND

In an example scenario, a method is implemented to protect codes or programs executed on devices against modification or attacks for fraudulent operation. To illustrate, in an example secure boot methodology, a processor in a device generates a digest of a boot code and uses a stored authentication signature of the boot code to validate the digest of the boot code. However, such boot implementation is performed locally by the processor of the device, and is therefore restricted by performance, storage and security of this local processor. Due to cost-constraints, the security of a local secure boot may be limited due to limited computational ability or lack of protection for the boot process, operating memory, and/or validating key. In some cases, an external device is used to validate the authenticity and report the validation result to the processor. However, there may exist multiple attack vectors that would permit an attacker to subvert the secure boot operation and allow fraudulent operation, e.g., modification of the boot code, using a man-in-the-middle device, or modification of the validating root public key or signature.

SUMMARY

This specification describes systems, methods, circuits and computer-readable mediums for controlled secure code authentication. In one aspect, a non-transitory computer-readable storage medium having instructions stored thereon which, when executed by one or more processors, cause the one or more processors to perform operations comprising: sending, from an authentication device, a request to a client device locally coupled to the authentication device, the request including a challenge for a property of a particular portion from among a plurality of portions of code stored within the client device, the challenge including data indicating a particular memory address range corresponding to the particular portion of the code; receiving, at the authentication device, a response to the request from the client device, the response including information associated with the property of the code; verifying correctness of the response based on the received information; and based on verifying correctness of the response, determining that the code is an authorized code.

The details of one or more disclosed implementations are set forth in the accompanying drawings and the description below. Other features, aspects, and advantages will become apparent from the description, the drawings and the claims.

DETAILED DESCRIPTION

System Overview

Figure 1A:
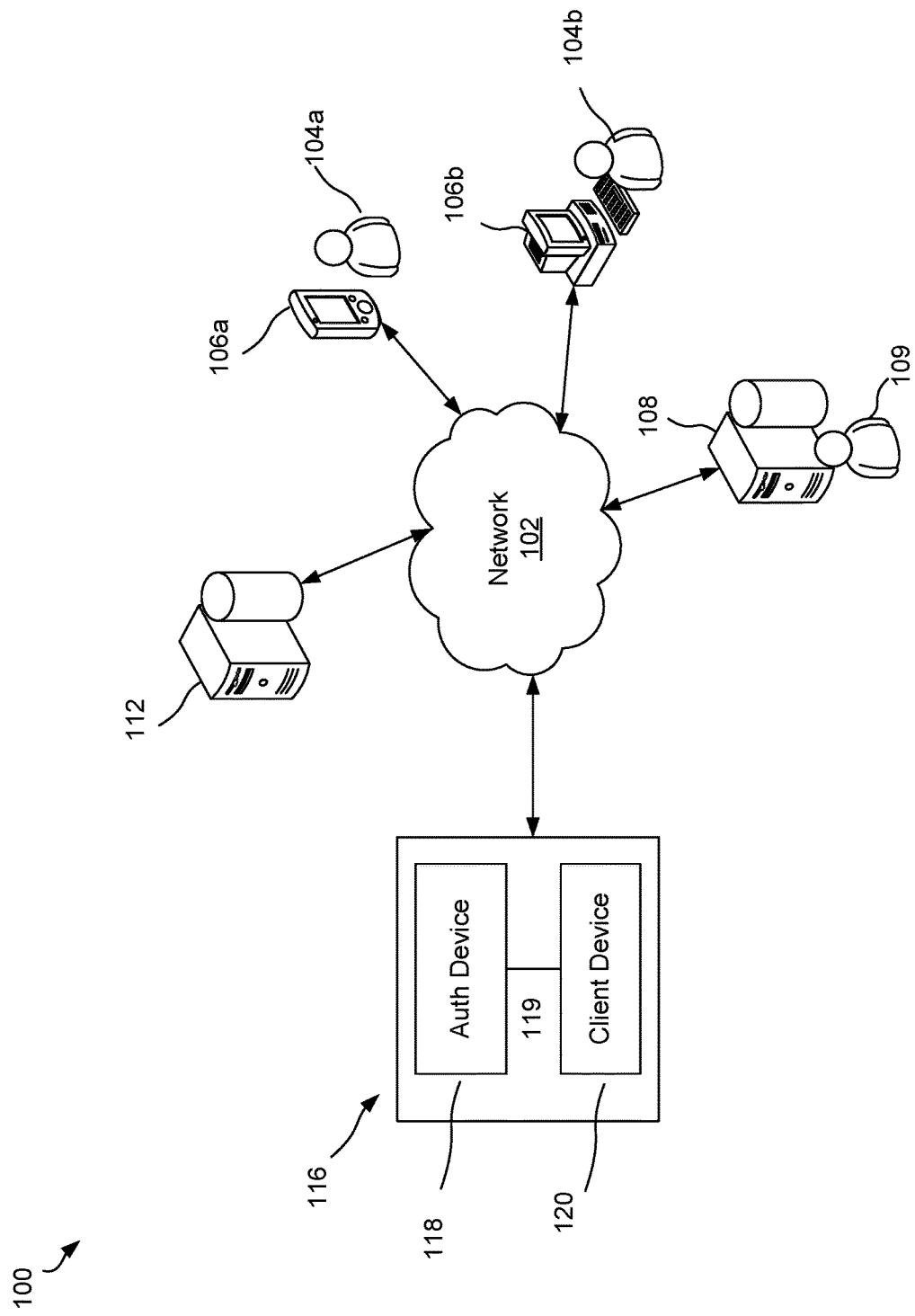
FIG. 1A is a block diagram of an example environment, according to an example embodiment.

FIG. 1A is a block diagram of an example environment 100, according to an implementation. For purposes of illustration, the environment 100 includes a system 116 (e.g., a client-side system) that includes a client device 120 and an authentication (Auth) device 118. The authentication device 118 is configured to validate whether codes or programs stored within the client device 120 are authorized (or authenticated) codes. A code of the client device 120 includes at least one of a boot code for the client device 120 to boot (or start up) or an operation code for the client device 120 to perform a corresponding operation.

The authentication device 118 is coupled to the client device 120 through a connection 119. In some implementations, the authentication device 118 and the client device 120 are most closely placed, and the connection 119 is wired by a data cable (e.g., a fiber optic cable or electrically conductive cable) or wireless. In some other implementations, the authentication device 118 and the client device 120 are physically coupled, and the connection 119 is a hardware interface, such as a PCI interface on a motherboard. In yet other implementations, where the authentication device 118 and the client device 120 are integrated on a same circuit board, the connection 119 is a conductor. The authentication device 118 and the client device 120 can be separate chips and integrated on the same circuit board.

Furthermore, in an embodiment, as discussed in further details below, system 116 is configured to communicate with one or more other devices or systems (host device 112, computing devices 106a, 106b, server computing system 108) over a network 102. Indeed, one embodiment provides that system 116 is a client of network 102, and authentication device 118 and client device 120 are therefore "locally" coupled together on the client-side. The host device 112, computing devices 106a, 106b, or the server computing system 108 is a host of network 102, remotely coupled to the system 116 on the host-side.

In some cases, the client device 120 is unsecured or lack of security, e.g., due to constrained cost. An attacker may attack the client device 120, e.g., to modify codes stored within the client device 120 for fraudulent purposes. In one example, the attacker can modify a boot code stored within the unsecured client device to reboot the client device without authentication. In another example, the attacker modifies an operation code stored within an unsecured client device to change an operation performed by the client device. To address these security problems, the authentication device 118 coupled to the client device 120 is configured to validate whether codes or programs stored within the client device are authorized codes. For example, the authentication device 118 sends a request to the client device 120 including a challenge for a property of a code of the client device 120. The client device 120 generates the property of the code stored within the client device 120 and sends back a response. The authentication device 118 verifies the response. Based on the verification result, the authentication device 118 determines whether the code stored within the client device is an authorized (or authenticated) code for the client device 120.

In some implementations, there exists a security policy between the authentication device 118 and the client device 120. For example, if a code stored within the client device 120 is an authorized code, the authentication device 118 can allow the client device 120 to access critical information, e.g., secrets or cryptographic keys, stored in a secure storage. The critical information may be required for proper performance of the client device 120. The secure storage can be included in the authentication device 118 or externally coupled to the authentication device 118. The authentication device 118 can also enable the client device 120, e.g., through a pin, to power on or enable specific hardware blocks in the client device 120. If the code is determined by the authentication device 118 to be an unauthorized code, the authentication device 118 can prohibit or restrict the client device 120 from accessing the critical information. The authentication device 118 can also send a request, e.g., to a secure source, to update the code stored within the client device 120. In this way, fraudulent operations can be minimized or eliminated, and the security of operations on the client device 120 can be improved.

In some implementations, the authentication device 118 is a trusted or secured device that has security capabilities greater than the client device 120, as discussed with reference to FIG. 2. In one example, the authentication device 118 includes a secure storage and/or a random number generator that are unavailable on the client device 120. In one embodiment, the client device 120 does not have the capabilities to include the secure storage and/or a random number generator. The authentication device 118 stores in the secure storage information associated with an authorized code for the client device 120. In some implementations, the information includes an entire image of the authorized code, a signature of the authorized code, a digest of the authorized code, a message authentication code (MAC) of the authorized code, or other properties of the authorized code. In some implementations, the information includes properties of a plurality of options of the authorized code, e.g., a digest or a signature or a MAC of each portion, or an address range for each portion. In some examples, the information does not include the entire image of the authorized code, but the digests or signatures or MACs of the portions of the authorized code and corresponding address ranges. In some examples, the authentication device 118 stores cryptographic or secure keys for the client device 120, e.g., to communicate with external devices.

In one embodiment, the environment 100 includes host device 112 coupled to the system 116 and/or the other systems through the network 102. The network 102 can be an external network for the system 116, e.g., a public communication network (e.g., the Internet, cellular data network, dialup modems over a telephone network), a wide area network (WAN), a local area network (LAN), a controlled area network (CAN), a private communications network (e.g., private LAN, leased lines), or any appropriate combination thereof.

The authentication device 118 and the client device 120 can download and/or update images of respective authorized codes from a source. The source can be a secure source, (e.g., secure hardware or a secure server) or an unsecured source. The authentication device 118 may verify a signature or a MAC of an entire code image before doing the downloading or updating of stored information of the code image. The host device 112 can store secret data or cryptographic keys for secure communication with the client device 120.

In some implementations, users 104*a*, 104*b* can use computing devices 106*a*, 106*b* to communicate with the system 116 over the network 102. The computing devices 106*a*, 106*b* can each be a computing device such as a mobile device, a laptop computer, a desktop computer, a smartphone, a personal digital assistant, a portable media player, a tablet computer, or any other computing device that can be used to communicate with the system 116. For illustration purpose, in FIG. 1A, the computing device 106*a* is depicted as a mobile device, and the computing device 106*b* is depicted as a desktop computer.

The user 104*a* or 104*b* can be an entity associated with the system 116. The user 104*a* or 104*b* can use the computing device 106*a* or 106*b* to check a status of the system 116 or remotely control an operation of the system 116 through the network 102 and/or the network 114. For example, the user 104*a* or 104*b* can use the computing device 106*a* or 106*b* to check whether a code stored within the client device 120 is an authorized code for the client device 120.

In some implementations, server computing system 108 is in communication with the system 116 through the network 102. The server computing system 108 includes one or more computing devices and one or more machine-readable repositories, or databases. The server computing system 108 is configured to communicate with a number of systems including the system 116. For each system, the server computing system 108 can securely store respective authorized codes for respective client devices and authentication devices in the system. The client devices and the authentication devices can download the respective authorized codes from the server computing system 108 through the network 102. A user 109, e.g., an administrator or an operator, of the server computing system 108, can use the server computing system 108 to communicate with an individual system such as the system 116, e.g., to check a status of the system.

Figure 1B:
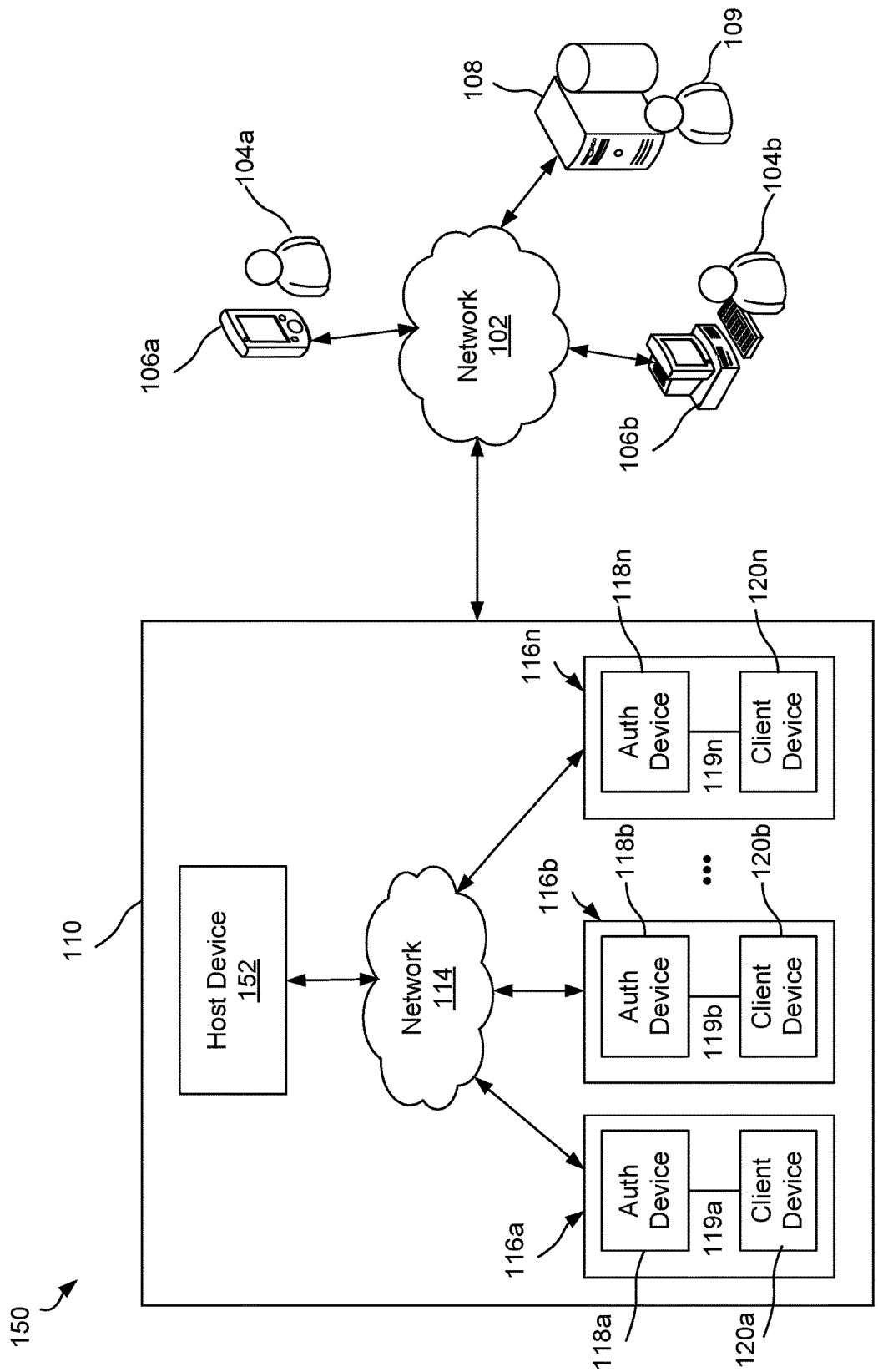
FIG. 1B is a block diagram of another example environment, according to an example embodiment.

FIG. 1B is a block diagram of another example environment 150, according to an implementation. The environment 150 can be similar to the environment 100 of FIG. 1A. The environment 150 includes a system 110 having a host device 152 and "n" subsystems 116*a*-116*n*. The subsystems 116*a*-116*n* can be identical to each other or different from each other. Each subsystem can be similar to the system 116 of FIG. 1A. The host device 152 communicates with the subsystems 116*a*-116*n* through a network 114. The network 114 can be a local area network for the system 110, e.g., a system bus. The network 114 can be a wired network, a wireless network, or any combination thereof.

Each subsystem 116*a*, 116*b*, or 116*n* can include a respective client device 120*a*, 120*b*, or 120*n* and a respective authentication (Auth) device 118*a*, 118*b*, or 118*n*. The authentication device 118*a*, 118*b*, or 118*n* can be externally and locally coupled to the respective client device 120*a*, 120*b*, or 120*n* through a connection 119*a*, 119*b*, or 119*n*. Each authentication device can be similar to the authentication device 118 of FIG. 1A. Each client device can be similar to the client device 120 of FIG. 1A. In some implementations, the authentication device and the client device are most closely placed, and the connection may be wired by a data cable or wireless. In some other implementations, the authentication device and the client device are physically coupled, and the connection may be a hardware interface, such as a PCI interface on a motherboard. In yet other implementations, where the authentication device and the client device are integrated on a same circuit, the connection may be a conductor.

In some implementations, the host device 152 is configured to check a status of each client device in each subsystem. For example, the host device 152 can send a query to the subsystem 116a for checking whether a code stored within the client device 120a is an authorized code. The authentication device 118a coupled to the client device 120a can receive the query, perform secure code authentication with the client device 120a, and send the authentication result back to the host device 152.

If the authentication device 118a determines that the code stored within the client device 120a is an authorized code, the authentication device 118a can send to the host device 152 a message indicating that the code stored within the client device 120a is the authorized code. In some cases, the host device 152 notifies the authentication device 118a to allow the client device to perform a corresponding operation using the code. In some cases, the host device 152 directly communicates with the client device 120a through the network 114.

If the authentication device 118a determines that the code stored within the client device 120a is not an authorized code, the authentication device 118a can send to the host device 152 a message indicating that the code stored within the client device 120a is not authorized. In some cases, the host device 152 notifies the authentication device 118a to prohibit the client device 120a from performing the operation using the code. In some cases, the host device 152 can notify the authentication device 118a and the client device 120a to update a new image of the authorized code.

The authentication devices 118a-118n and the client devices 120a-120n can download and/or update images of respective authorized codes from a source, e.g., secure hardware or a secure server. In some implementations, the host device 152 includes a secure storage for securely storing an entire image of an authorized code for each client device in each subsystem. The host device 152 can also update an entire image of a particular authorized code for a particular client device in a particular subsystem and notify the particular client device and a corresponding authentication device in the particular subsystem to download the updated image. The host device 152 can also store secret data or cryptographic keys for secure communication with the client devices and/or the authentication devices in the subsystems.

In some implementations, the subsystems 116a-116n are identical to each other. The client devices 120a-120n perform a same operation, e.g., a booting operation, using a same authorized code, e.g., a boot code. The authentication devices 118a-118n can download a same image of the authorized code, e.g., from the host device 152. Each of the authentication devices 118a-118n can select a set of portions of the authorized code and use the set of portions for secure code authentication with the corresponding client device 120a, 120b or 120n. For example, the authentication device 118a, 118b, or 118n can calculate respective digests of the set of portions and determine respective memory address ranges (physical or virtual) for the digests of the set of portions. The authentication device 118a, 118b, or 118n can send a random address range in a challenge to the client device 120a, 120b, or 120n, which requests a digest of a particular portion of the authorized code corresponding to the address range. The authentication device can generate different challenges for the client device 120a, 120b, or 120n, each including a different address range corresponding to a different portion of the authorized code.

Different authentication devices can select different sets of portions of the authorized code, and/or have different sets of address ranges for the client devices. In some cases, the authentication device 118a, 118b or 118n updates a new image of the authorized code and selects a new set of portions of the authorized code. The new set of portions of the authorized code can be different from a previous set of portions selected by the same authentication device.

In some implementations, the subsystems 116a-116n are different from each other. The client device 120a-120n in each subsystem 116a, 116b, or 116n can perform a corresponding operation using a corresponding authorized code. The authentication device 118a, 118b, or 118n in the same subsystem can download a copy of the corresponding authorized code for the client device 120a, 120b, or 120n, e.g., from the host device 152. The authentication device 118a, 118b, or 118n can select a set of portions of the corresponding authorized code and use the set of portions for secure code authentication with the corresponding client device 120a, 120b, or 120n. The authorized codes for different client devices 120a-120n can be different from each other. Different authentication devices 118a-118n can select different sets of portions of the different authorized codes for secure code authentication with the client devices 120a-120n.

The disclosed implementations can be used in different environments. In some implementations, the environment 100 (or the environment 150) is a car environment. The system 116 (or the system 110) can be a controller (e.g., an ECU) for a component in the car, e.g., a window controller, a brake controller, or a wheel controller. The host device 112 (or the host device 152) can be a central computing system of the car, e.g., an electronic control unit (ECU), or a gateway for directing messages from the client device to a remote computing device, e.g., the server computing system 108, or the computing device 106a or 106b. The user 104a or 104b can be an owner of the car and communicate with the car using a mobile phone 106a or a computer 106b through the network 102 and/or the network 114. The server computing system 108 can be a server configured to control a number of cars and associated with an entity, e.g., a car manufacturer, a car dealer, or an enterprise. It is appreciated that the disclosed implementations are not limited to the car environment and may be applicable in other contexts. For example, the system 116 (or the system 110) can be included in an appliance, e.g., a lamp, an alarm, a garage opener, or a sensor, of a home network.

In some examples, a digest is associated with a cryptographic hash function. A device, e.g., the authentication device 118 or the client device 120, takes an arbitrary block of data, e.g., a code or program, and uses the cryptographic hash function to compute a string, wherein the string is the (cryptographic) hash value. The data to be encoded may be referred to as the "message," and the hash value may be referred to as the "message digest", or simply as the "digest". The cryptographic hash function can include, for example, a Secure Hash Algorithm (SHA) such as SHA-256 or a MD5 message-digest algorithm. The generated digest can have a fixed length or a varied length. It is noted, however, that the present technology is not limited to the implementation of such an example algorithm, and that other types of hash functions may be implemented.

In some examples, a signature is a mathematical scheme for demonstrating authenticity of a digital message, e.g., a digest of a code. The signature can be generated by a digital signature algorithm (DSA), e.g., an Elliptic Curve Digital Signature Algorithm (ECDSA). A device can use the DSA to compute or generate a signature of a digest using the digest and a key, e.g., a private key. It is noted, however, that the present technology is not limited to the implementation of such an example algorithm, and that other types of signature algorithms may be implemented.

In some examples, a message authentication device (MAC) is a piece of information used to authenticate a message. An algorithm accepts as input a secret key and a message to be authenticated, and outputs a MAC. The algorithm can be, for example, a keyed-hash message authentication code (HMAC) or an Advanced Encryption Standard (AES) Cipher-based Message Authentication Code (CMAC) (AES-CMAC) algorithm or many others.

In some examples, a checksum (or hash sum) is a small-size datum from a block of digital data (e.g., a code) for detecting errors which may have been introduced during its transmission or storage. The checksum can be used to verify data integrity. A checksum can be generated by a checksum algorithm or a checksum function.

In some examples, an authorized code for a device represents an original code without change or modification, e.g., as intended by an Original Equipment Manufacture (OEM) of the device or an entity associated with the device. A code is an authorized code when unchanged or unmodified and is unauthorized code when changed or modified. The terms "authorized code" and "authenticated code" can be interchangeably used.

Example Host and Client Devices

Figure 2:
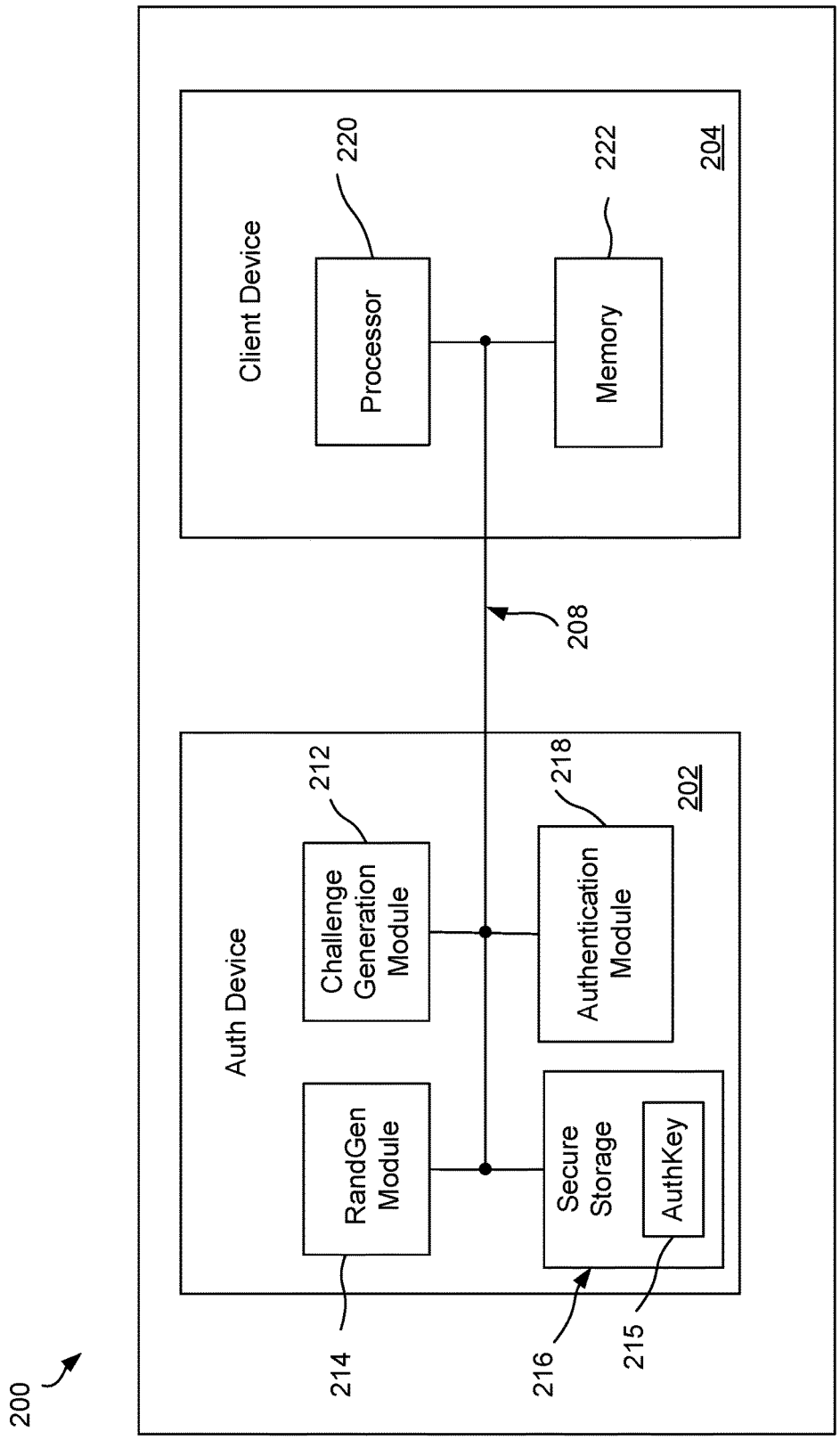
FIG. 2 is a block diagram of an example system including an example authentication device performing controlled secure code authentication on an example client device, according to an example embodiment.

FIG. 2 is a block diagram of an example system 200, according to an embodiment. An example authentication device 202 performs controlled secure code authentication for an example client device 204. The system 200 can be similar to the system 116 of FIG. 1A. The authentication device 202 can be similar to the authentication device 118 of FIG. 1A. The client device 204 can be similar to the client device 120 of FIG. 1A. The authentication device 202 is configured to verify whether a code stored within the client device 204 is an authorized code. The authentication device 202 is coupled to the client device 204 using a connection 208. The connection 208 can be similar to the connection 119 of FIG. 1A.

In some implementations, the authentication device 202 includes, among other components, a challenge generation module 212, a random generation module 214, a secure storage 216, and an authentication module 218. In one embodiment, the challenge generation module 212, the random generation module 214, the secure storage 216, and the authentication module 218 are different programs, subroutines, or portions of code that are stored within one or more storage devices within the authentication device 202. That is, these modules do not need to be separate physical components, instead, they can be software modules. In some implementations, the secure storage 216 is external to the authentication device 202 and coupled to the authentication device 202 through a secure or protected channel. For example, the secure storage 216 can be in a trusted third party entity. The authentication device 202 can retrieve information from the secure storage 216.

The challenge generation module 212 is configured to generate challenges for the client device 204. The challenge generation module 212 can generate different challenges for the client device 204 at different times. A challenge includes a query to the client device 204 for requesting a property of a code (or a portion of such code) stored on the client device 204. The property can be a cryptographic property, e.g., a digest, a signature, a checksum, or a message authentication code (MAC). A challenge can also include a request for a property of a particular portion of the authorized code. In some examples, the particular portion corresponds to a memory address range (physical or virtual), e.g., an address pair including a starting address and an ending address, a middle address with a width, a starting address with a width, or an ending address with a width. The challenge can include the address range to represent the particular portion. In some implementations, a challenge includes information associated with cryptographic or authentication keys for secure authentication and/or authentication.

The random generation (RandGen) module 214 is configured to generate a random number used as a seed for cryptographic operations performed by the authentication device 202. For example, the random generation module 214 includes a random number generator that returns a certain number of random bytes (e.g., 32 random bytes) to the challenge generation module 212. In some implementations, the challenge generation module 212 combines this generated random number with a separate input number to form a cryptographic "nonce" that is stored within the authentication device 202 and may be used by subsequent commands. The authentication device 202 can send the client device 204 a nonce together with a challenge for a property of a code of the client device 204. The client device 204 can generate the property of the code and hash the generated property of the code with the nonce. The authentication device 202 can then verify whether a response from the client device 204 includes information associated with the nonce. In such a way, the authentication device 202 can ensure that a response to a challenge has not been copied by an attacker and replayed a subsequent time. The random generation module 214 can be included in the challenge generation module 212.

In some examples, a nonce is an arbitrary number that is used only once in a cryptographic communication between devices. The nonce may be a random or pseudo-random number issued in an authentication protocol to ensure that old communications cannot be reused in replay attacks. A nonce also may be used to ensure security for a stream cipher. To ensure that a nonce is used only once, it can be time-variant (including a suitably fine-grained timestamp in its value), or generated with enough random bits to ensure a probabilistically insignificant chance of repeating a previously generated value.

The secure storage 216 is configured to store secure information including information of an authorized code for the client device 204 and/or authentication keys (AuthKey) 215. The authentication keys 215 can include a symmetric cryptographic key or an asymmetric cryptographic key for authentication or cryptographic functions. The secure storage 216 can also store secrets or authentication or cryptographic keys for the client device 204, e.g., for communication with other devices such as the computing device 106a or 106b, the server computing system 108, or the host device 112 of FIG. 1A.

In some implementations, the information of the authorized code stored in the secure storage 216 includes an entire image or copy of the authorized code, a digest of the authorized code, a signature of the authorized code, a MAC of the authorized code, or any other properties of the authorized code. The entire image of the authorized code can be stored in the secure storage 216 during a phase of production of the authentication device 202 such as manufacturing, factory initialization, personalization, or distribution. The entire image of the authorized code can be also copied or downloaded from a secure source, e.g., a secure hardware or a secure server such as the server computing system 108 of FIG. 1A. The authentication device 202 can also update the stored information of the authorized code from the secure source.

In some implementations, the signature of the authorized code is an Original Equipment Manufacture (OEM) signature for the client device 204, which can be stored in the authentication device 202 during the phase of production of the authentication device 202, or copied, downloaded, or updated to the authentication device 202 after the phase of production. In some examples, the authentication device 202 generates the signature of the authorized code based on the digest of the authorized code using a digital signature algorithm with a secure key. The secure key can be stored as an authentication key 215 in the secure storage 216 together with the information of the authorized code.

In some implementations, the information of the authorized code stored in the secure storage 216 includes information of a plurality of individual portions of the authorized code, such as a copy of an individual portion, a digest or a signature or a MAC of the individual portion, and/or an address range of the individual portion. In some examples, the secure storage 216 stores the information of the portions, without information associated with the entire image of the authorized code. In some examples, the secure storage 216 stores a signature or digest of the entire image of the authorized code, e.g., the OEM signature, in the secure storage 216, together with the information of the portions.

In some implementations, the authentication device 202 selects a number of portions from the entire image of the authorized code, e.g., during downloading the entire image from a secure source. The authentication device 202 can then calculate a respective digest for each portion using a cryptographic hash function or a hash algorithm, and store the digests of the portions in the secure storage 216. The authentication device 202 can also calculate a respective signature for each portion using the respective digest and store the signatures in the secure storage 216. In some implementations, the authentication device 202 determines a respective address range for each portion or a digest of each portion, stores the address ranges of the portions in the secure storage 216, and associates the respective address ranges with the respective digests or signatures of the portions in the secure storage 216. Each time a new image is presented, the challenge generation module 212 can randomly select an address range from the plurality of address ranges and generate a challenge based on the selected address range. The challenge generation module 212 can also randomly select two or more address ranges and generate a challenge based on a combination of the two or more address ranges.

The secure storage 216 can be a portion of the authentication device 202 that implements strong security mechanisms such that the data included in the secure storage 216 is not easily copied, cloned or modified, and any unauthorized change to the data within is detectable by a verifying device. In some implementations, the secure storage 216 includes persistent memory such as an electronically erasable read-only memory (EEPROM) array, a flash memory, a hard drive, or any other suitable storage mechanism that is configured for storing data in a persistent manner. As indicated previously, the secure storage 216 may be used for storing information associated with the authorized code of the client device 204, authentication keys 215, miscellaneous read/write, read-only or secret data, consumption logging, and security configuration. Access to the various sections of the secure storage 216 may be restricted in a variety of ways and then the configuration locked to prevent changes.

In some implementations, the secure storage 216 includes ephemeral memory used for temporary storage of data. For example, the ephemeral memory may be a static random access memory (SRAM) where downloaded or updated images of authorized codes are buffered during secure communications with a secure source or results of cryptographic or authentication operations are buffered during secure communications with the client device 204. In one embodiment, the secure storage includes an SRAM backed up with a power source, e.g., a battery or a capacitor. In some implementations, the ephemeral memory is used to store the input command or output result and intermediate computation values. The entire contents of the ephemeral memory may be invalidated whenever the secure storage 216 goes into sleep mode or the power is removed.

The authentication module 218 is configured to verify responses to challenges from the client device 204 to determine whether a code on the client device 204 is an authorized code. The authentication module 218 is configured to communicate with and obtain information from the secure storage 216, the challenge generation module 212, and/or the random generation module 214. For example, the challenge generation module 212 sends a challenge for requesting a cryptographic property of a code of the client device 204. The client device 204 may send back a response including a cryptographic property of the code stored within the client device 204. The authentication module 218 can obtain the cryptographic property of an authorized code corresponding to the code of the client device 204, e.g., from information associated with the authorized code stored in the secure storage 216, and determine whether the cryptographic property of the code received in the response matches with the obtained cryptographic property of the authorized code. If the cryptographic property of the code matches with the obtained cryptographic property of the authorized code, the authentication module 218 can determine that the code stored within the client device 204 is the authorized code. If the cryptographic property of the code does not match with the obtained cryptographic property of the authorized code, the authentication module 218 determines that the code is not the authorized code or unauthorized.

In some implementations, the client device 204 includes, among other components, a processor 220 and memory 222. The memory 222 is configured to store one or more codes of the client device 204. The processor 220 is configured to perform actions or operations using corresponding codes. The memory 222 can be an internal or external memory of the processor 220. A code and/or information associated with the code (e.g., an OEM signature of the code) can be stored in the memory 222 during a phase of production of the client device 204 such as manufacturing, factory initialization, personalization, or distribution. The code and/or associated information can be also copied or downloaded from a secure source such as secure hardware or a secure server. The client device 204 can also update the code and/or associated information from the secure source. The client device 204 may be unsecured or lack of security. For example, the memory 222 may be unsecured, and the code and/or associated information stored in the memory 222 may be modified by an attacker.

In some implementations, the processor 220 is configured to response to challenges or queries from the authentication device 202. In some cases, the client device 204 receives, from the authentication device 202, a request including a challenge for a cryptographic property of the code, e.g., a digest or signature or MAC of the code. The processor 220 can obtain or generate a cryptographic property of the code based on information from the memory 222 including the stored code and/or associated information and send back a response including the obtained cryptographic property of the code.

In some examples, the challenge requests a signature of the code, the processor 220 calculates a digest of the code and create a signature of the digest with a private key stored within the memory 220. In some examples, the challenge requests a MAC of the code, the processor 220 calculates the MAC of the code with a secret key stored within the memory 220. The secret key can be shared with the authentication device 202. The authentication device 202 can verify the MAC using the shared secret key.

In some examples, the challenge requests a cryptographic property of a particular portion of the code. For example, the challenge includes a particular address range corresponding to the particular portion. The processor 220 can identify a portion of the code corresponding to the particular address range and obtain the cryptographic property of the corresponding portion of the code.

In some implementations, the client device 204 includes a pin coupled to the connection 208. Upon authentication of the code stored in the client device 204, the authentication device 202 sends a control signal to the pin to enable the client device 204. In some examples, the pin is a hardware pin, and the control signal is an electrical signal that powers on or enables specific hardware blocks in the client device 204.

Example Flowcharts

Figure 3A:
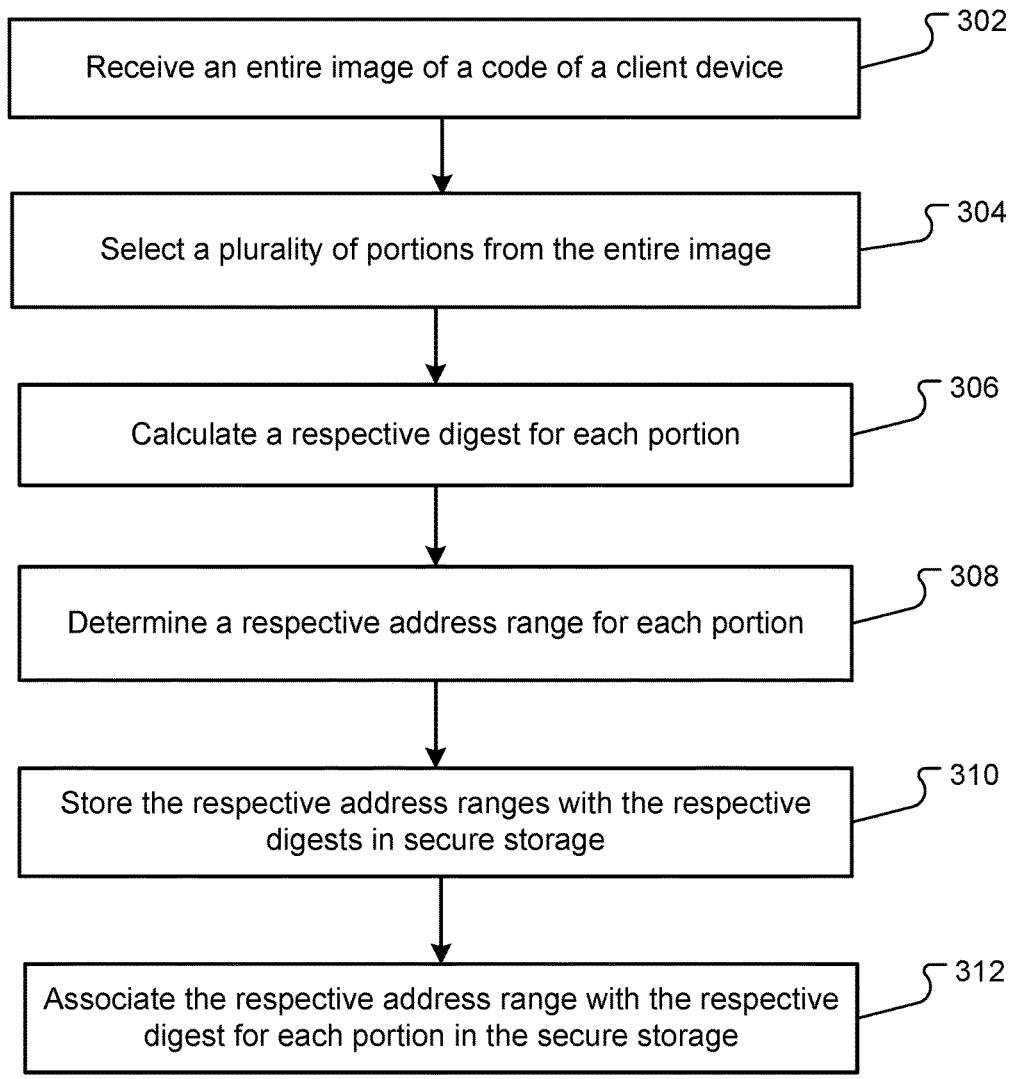
FIG. 3A is a flow diagram of an example process by which an authentication device stores information of an authorized code for a client device, according to an example embodiment.
Figure 3B:
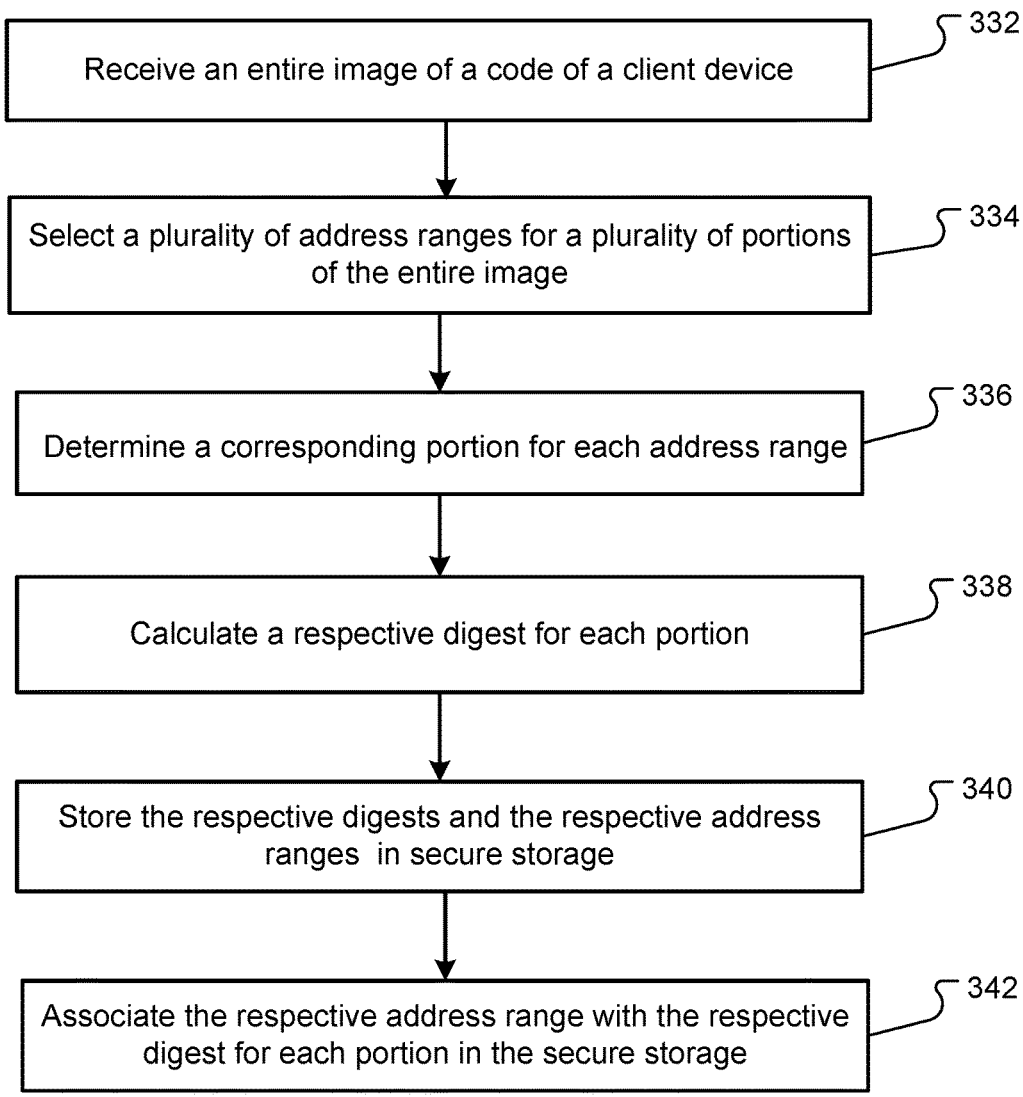
FIG. 3B is a flow diagram of another example process by which an authentication device stores information of an authorized code for a client device, according to an example embodiment.
Figure 3C:
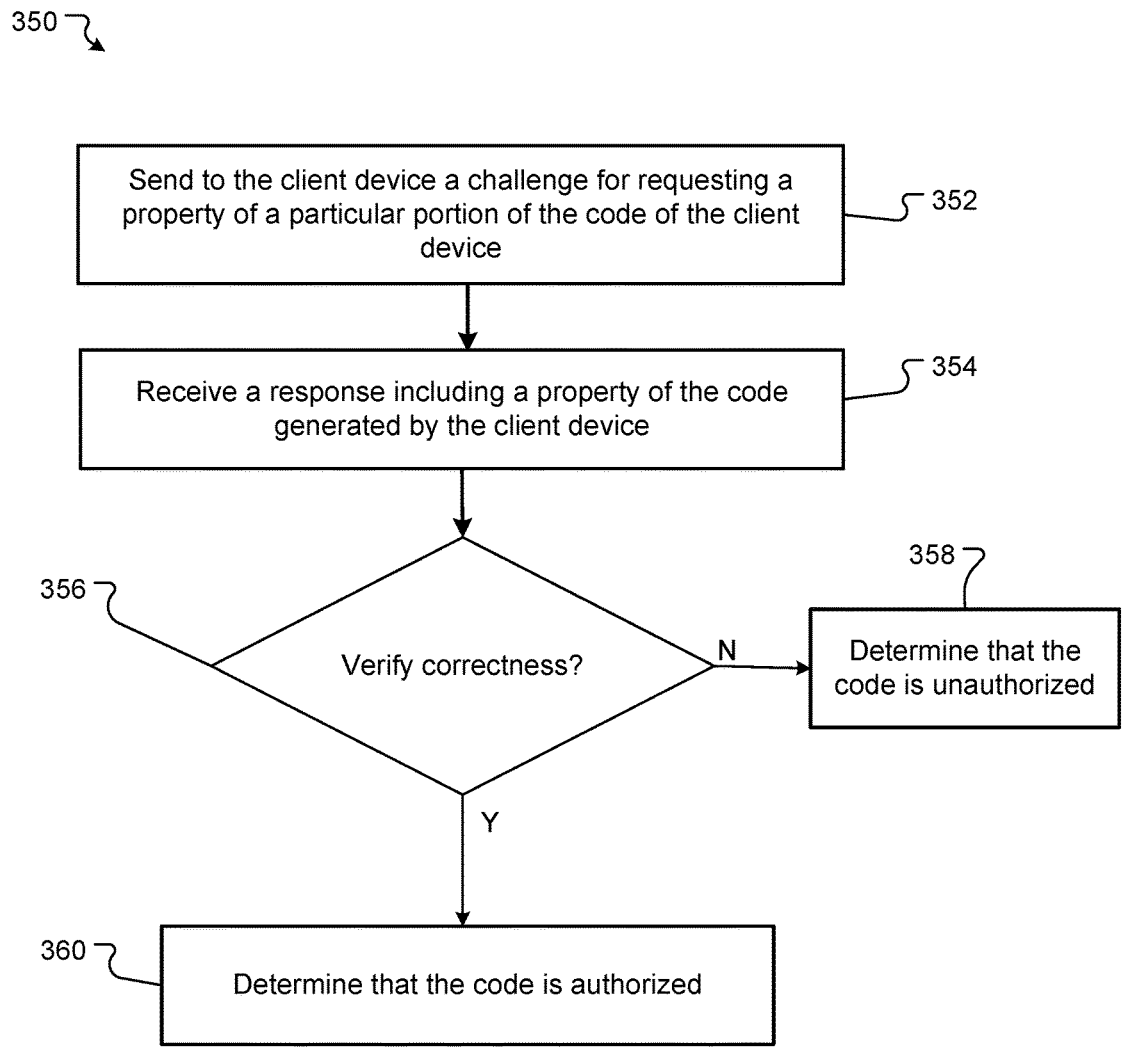
FIG. 3C is a flow diagram of an example process by which an authentication device may perform secure code authentication on a client device, according to an example embodiment.

FIG. 3A is a flow diagram of an example process 300 by which an authentication device stores information of an authorized code for a client device. FIG. 3B is a flow diagram of another example process 330 by which the authentication device stores information of the authorized code for the client device. FIG. 3C is a flow diagram of an example process 350 by which the authentication device may perform secure code authentication for the client device. The authentication device can be similar to the authentication device 118 of FIG. 1A or the authentication device 202 of FIG. 2. The client device can be similar to the client device 120 of FIG. 1A, or the client device 204 of FIG. 2.

Referring now to FIG. 3A, the authentication device receives an entire image of the authorized code (302). The authorized code corresponding to a code of the client device. For example, the authorized code is an authenticated operation code for the client device to perform an operation. In some cases, the authorized code is a portion of a downloadable boot code. The authentication device can receive the entire image of the authorized code from a source. The client device can receive the entire image of the authorized code from the source, e.g., at the same time as the authentication device.

The authentication device can also receive an overall signature of the entire image of the authorized code, e.g., an OEM signature. In some implementations, the authentication device calculates a digest of the entire image of the authorized code, and verifies authenticity or integrity of the entire image based on the received overall signature and the computed digest. For example, the authentication device can create a signature of the received entire image based on the calculated digest and a secret or authentication key and verify the created signature with the received overall signature. The authentication device can verify the overall signature during the transfer of the entire image. The authentication device can include ephemeral memory for temporary storage of the entire image of the authorized code.

The authentication device selects a plurality of portions from the entire image of the authorized code (304). The authentication device can randomly select the plurality of portions, e.g., using a random algorithm. A number of the portions N can be selected based on cost, security, and/or performance. In some examples, the number N is in a range of 8 to 32, and can be higher or lower arbitrarily. The properties of the portions, e.g., a total size, can be specified in an initial part of the entire image and/or covered with an image signature or fixed or randomized in advance. The portions can have a fixed size, or a larger or smaller size than the fixed size. The portions can have different sizes. The portions could overlap, cover all bytes once, or cover a subset of the entire image.

The authentication device calculates a respective digest for each portion (306). The authentication device can calculate a digest of the portion, e.g., using a cryptographic hash function or a hash algorithm. In some examples, the authentication device creates a signature of the portion using the calculated digest and a secret or authentication key.

The authentication device determines a respective address range for each portion (308). The authentication device can determine the address range based on the corresponding digest of the portion or the portion itself. The address range can be defined by an address pair including a starting address and an ending address, a middle address with a range width, or a starting address with a range width. Different portions can have different address ranges.

The authentication device stores the address ranges and the respective digests in secure storage (310), and associates, for each portion, the respective address range with the respective digest in the secure storage (312). The authentication device can also store and associate other cryptographic properties of the portion, e.g., the signature of the portion, with the address range and/or the digest. The authentication device can store information of the plurality of portions, e.g., the address ranges, the digests, and/or the signatures of the portions of the authorized code, without storing an entire image of the authorized code and/or the portions of the authorized code themselves. The secure storage can be similar to the secure storage 216 of FIG. 2. The secure storage can also store secrets, authentication, and/or cryptographic keys for the authentication device and/or the client device.

The process 300 can be executed during a phase of production of the authentication device such as manufacturing, factory initialization, personalization, or distribution. The authentication device can also execute the process 300 to update information of the authorized code from a secure source. In some implementation, the authentication device receives a second entire image of a second authorized code for the client device. The second authorized code can be identical to the authorized code or different from the authorized code. The authentication device can select a plurality of second portions from the second entire image, e.g., using a random algorithm, and determine information of each portion, including a digest, a signature, and/or an address range. The address ranges of the second portions can be different from the address ranges of the previous portions. The authentication device can replace the previously stored information of the portions of the authorized code, with the new information of the second portions of the second authorized code.

Referring to FIG. 3B, the example process 330 shows another way by which the authentication device stores information of an authorized code for a client device. The authentication device receives an entire image of a code of a client device (332). The authentication device selects a plurality of address ranges for a plurality of portions of the entire image (334). For example, the entire image includes a starting address and an ending address of the code. The authentication device can randomly select multiple pairs of starting address and ending address to use as the plurality of address ranges. Each address range corresponds to a particular portion of the code. The authentication device determines a corresponding portion for each address range based on the address range of the code (336), and calculates a respective digest for each portion (338). Then the authentication devices stores the calculated digests and respective address ranges in a secure storage (340) and associates the respective address range with the respective digest for each portion in the secure storage (342).

Referring now to FIG. 3C, the authentication device can use information of one or more portions of the authorized code for secure code authentication for the client device. The authentication device sends to the client device a request including a challenge for a property of a particular portion of a code stored within the client device (352). The property can be a digest, a signature, or a MAC.

The challenge can include an address range associated with the particular portion of the code. The authentication device can generate the challenge using a challenge generation module, e.g., the challenge generation module 212 of FIG. 2. The authentication device can select the address range from a plurality of address ranges stored in the secure storage, e.g., using a random algorithm.

In some examples, the challenge includes a query (e.g., a nonce query) together with the address range. The client device can be requested to generate a response including information associated with the query. For example, the authentication device and the client device can have a secure policy. According to the secure policy, in response to receiving the challenge, the client device can calculate a cryptographic property of a code stored within the client device, e.g., a digest associated with the code, and hash the cryptographic property with a query. The query can vary each time, and the response of the client device can change correspondingly, such that an attacker cannot replay a response that was previously transmitted.

In some examples, the challenge or the request is encrypted by a secret key to create a MAC of the challenge or the request to ensure its integrity. The secret key can be a symmetric cryptographic key and shared by the authentication device and the client device.

In some examples, the challenge includes a request for the client device to create a MAC of a response using a secret key. The MAC can be created by an HMAC or AES-CMAC algorithm. The secret key can be a symmetric cryptographic key and shared by the authentication device and the client device. The authentication device can verify the MAC of the response from the client device using the secret key. This can prevent an attacker from attempting to copy and store a correct response to the challenge or a number of responses to a number of challenges from the authentication device.

In some examples, the challenge includes a request for a cryptographic property of an entire image of the code, e.g., a digest or signature or MAC of the entire image, together with the request for the particular portion of the authorized code.

In some examples, the challenge includes a request for a cryptographic property of a merged portion of the code. The merged portion can include two or more different portions of the plurality of portions of the code. The challenge can include an address range combining respective address ranges corresponding to the two or more different portions. The two or more different portions can be adjacent to each other, or separated from each other. In this way, the authentication device can store information associated with the number of portions and generate a number of challenges more than the number of portions, which can make analysis attacks more complicated.

In some implementations, the authentication device receives a message informing the authentication device that the client device is to perform an action. In some examples, when the client device is reset or whenever power is removed from the client device, the client device repeats a boot process, which can trigger the client device to send a message to the authentication device that rebooting has occurred on the client device. In response to receiving the message, the authentication device can execute a reset sequence at the same time as the client device, e.g., to prevent attacks in which a memory in the client device is modified after the authentication step. In some implementations, the client device and the authentication device can use a same power supply, connect to a same rest signal, or have other synchronization methods.

In some examples, the authentication device determines that the client device is untrusted based on a predetermined schedule. For example, power cycling of the client device causes the client device to repeat the booting operation in a predetermined schedule, which triggers the client device to send a message to the authentication device in the predetermined schedule. However, when the power cycling does not happen according to the predetermined schedule, for example, the power cycling is modified or changed, the authentication device can determine that the client device is untrusted. In some cases, the authentication device can send an authentication request to the client device, e.g., using a cryptographic key. In response to receiving correct authentication information from the client device, the authentication device sends the challenge to the client device. Otherwise, if the authentication fails, the authentication device can restrict or prohibit the client device to reboot.

The authentication device receives a response to the request from the client device (354). The response can include a cryptographic property of the code stored within the client device. In some examples, the challenge includes a request for a digest of the particular portion of the code. The client device can determine a portion of the code corresponding to the particular portion. For example, the challenge includes an address range corresponding to the particular portion. The client device can find the corresponding portion of the code based on the address range in the challenge. The client device can calculate a digest of the corresponding portion of the code and send the digest in the response to the authentication device. In some examples, the challenge includes a request for a signature of the particular portion of the authorized code. The client device can create a signature based on a digest of the corresponding portion of the code and a secret or authentication key stored within the client device.

In some implementations, the authentication device requests the client device to response within a predetermined period of time, e.g., after a reset-pin assertion or after the authentication device sends the challenge. The predetermined period of time can be programmed into the authentication device, e.g., at a phase of production of the authentication device such as manufacturing. The predetermined period of time can be also sent to the authentication device, together with a signed image.

The authentication device can determine whether a period of time between sending the challenge or the reset-pin assertion and receiving the response to the challenge is smaller than the predetermined period of time. If the determined period of time is identical to or larger than the predetermined period of time, the authentication device can terminate the process 350. The authentication device can go back to the step 352 to send a new challenge to the client device for authentication. If the determined period of time is smaller than the predetermined period of time, the process 350 proceeds to step 356.

The authentication device verifies whether the response is correct based on the stored information of the particular portion of the authorized code (356). The authentication device can obtain the cryptographic property of the particular portion of the authorized code based on the information of the particular portion of the authorized code stored in the secure storage, and determine whether the cryptographic property of the code in the response matches with the obtained cryptographic property of the particular portion of the authorized code.

As noted above, the response could include a signature of a portion of the code. If the authentication device stores a signature of the particular portion of the authorized code, the authentication device can retrieve the stored signature of the particular portion and compare the retrieved signature with the signature of the portion of the code in the response.

If the authentication device does not store the signature of the particular portion, the authentication device can create a signature based on a digest of the particular portion of the authorized code and a cryptographic key stored in the secure storage. The cryptographic key can be a public key corresponding to a private key stored in a secure device associated with the client device. The signature of the code can be generated using the private key by the client device. The authentication device can determine whether the created signature of the particular portion of the authorized code matches with the signature of the code in the response. If the authentication device determines that the created signature of the authorized code matches with the signature of the code in the response, the authentication device determines that the response is correct. If the authentication device determines that the created signature of the particular portion of the authorized code does not match with the signature of the code in the response, the authentication device determines that the response is incorrect.

If the authentication device verifies incorrectness of the response, the authentication device determines that the code is unauthorized (358), that is, the code is not the authorized code. Accordingly, the authentication device can prohibit the client device from accessing critical information (e.g., secrets or keys) stored in a secure storage and for proper performance. For example, the client device uses the critical information to communicate with an external device, e.g., the computing device 106a or 106b, the server computing system 108, or the host device 112 of FIG. 1A. If the authentication device verifies correctness of the response, the authentication device determines that the code is authorized (360), that is, the code is the authorized code. Accordingly, the authentication device can allow the client device to access the critical information or enable the client device through a pin.

In response to determining that the code is authorized, the authentication device can apply a policy for sequential communication of the client device. The policy can include a symmetric key authentication or asymmetric key authentication. The code can be a boot code. In some examples, a symmetric key stored in the client device is enabled during secure boot, and runtime connection between the client device and the authentication device. In some examples, each time after the client device completes secure boot successfully, the authentication device transfers a new asymmetric key (e.g., a private key) to the client device via an asymmetric key exchange or agreement or other cryptographic method. The authentication device can store a corresponding asymmetric key (e.g., a public key) in the secure storage.

In some implementations, the authentication device generates a plurality of challenges for the client device. The plurality of challenges can include a first number of first challenges associated with a first portion of the authorized code and a second number of second challenges associated with a second portion of the authorized code. The authentication device can vary at least one of a ratio of the first number and the second number or a sequence of the first challenges and the second challenges. In some examples, the authentication device stores the plurality of challenges and each challenge can have a variable probability of being sent to the client device. Suppose that the number of challenges is 8. The eight challenges can be sent out with the following probabilities, e.g., the first three challenges each with a probability of 25%, the fourth challenge with a probability of 13%, the fifth challenge with a probability of 7%, the sixth challenge with a probability of 3%, and the seventh and eighth challenges each with a probability of 1%. In this way, it can be more difficult for an attacker to collect all the possible challenges.

In some examples, the authentication device times out the stored memory address ranges of portions of the authorized code. For example, the authentication device determines that a plurality of challenges sent to the client device comprises requests for cryptographic properties of each of the plurality of stored message ranges of the portions of the authorized code. In response to the determining, the authentication device can require a new image of the code of the client device to be re-downloaded to improve security.

In some examples, the authentication device requires additional verification as a function of time. For example, the authentication device can re-challenge the client device as a function of time to increase a size of a selected portion of the code or different challenge, etc.

Example Concepts

In view of the foregoing, it is noted that the present technology may be implemented, for example, in accordance with the following example concepts:

1. A non-transitory computer-readable storage medium having instructions stored thereon which, when executed by one or more processors, cause the one or more processors to perform a method including: sending, from an authentication device, a request to a client device coupled to the authentication device, the request including a challenge for a property of a particular portion from among a plurality of portions of code stored within the client device, the challenge including data indicating a particular memory address range corresponding to the particular portion of the code; receiving, at the authentication device, a response to the request from the client device, the response including information associated with the property of the code; verifying correctness of the response based on the received information; and based on verifying correctness of the response, determining that the code is an authorized code.

2. The computer-readable storage medium of Concept 1, where the method further includes: selecting a plurality of memory address ranges of the authorized code; determining a respective portion of the authorized code for each of the plurality memory address ranges; and calculating a respective property of each determined portion.

3. The computer-readable storage medium of Concept 2, where the method further includes: storing first information indicative of the respective properties of the portions of the authorized code and second information indicative of the respective memory address ranges in a secure storage; and respectively associating memory address ranges from among the plurality of memory address ranges with properties from among the properties of the portions in the secure storage.

4. The computer-readable storage medium of Concept 3, where the selecting the plurality of memory address ranges of the authorized code includes: randomly selecting the plurality of memory address ranges from a range defined by a starting address of the authorized code and an ending address of the authorized code.

5. The computer-readable storage medium of Concept 3, where the method further includes: randomly selecting the particular memory address range from among the plurality of memory address ranges, the particular memory address range being associated with a particular property of the particular portion of the authorized code in the secure storage.

6. The computer-readable storage medium of Concept 5, where the information in the response includes a property of a portion of the code, and where the verifying correctness of the response includes determining that the property of the portion of the code in the response matches the particular property of the particular portion of the authorized code stored in the secure storage.

7. The computer-readable storage medium of Concept 2, where the method further includes: receiving an entire image of the authorized code; receiving a signature associated with the authorized code; calculating a digest of the received entire image of the authorized code; and verifying authenticity of the received entire image based on the received signature and the calculated digest of the received entire image.

8. The computer-readable storage medium of Concept 2, where the method further includes: receiving an entire image of the authorized code; selecting randomly a plurality of second address ranges of the second entire image of the authorized code; determining a respective second portion of the authorized code for each second address range; calculating a respective second property of each determined second portion of the authorized code; and replacing the respective properties of the portions of the authorized code with the respective second properties of the second portions of the authorized code in a secure storage.

9. The computer-readable storage medium of Concept 1, where the method further includes: in response to determining that the code is the authorized code, enabling the client device to use secret data or cryptographic keys stored in a secure storage.

10. The computer-readable storage medium of Concept 1, where the method further includes: in response to determining that the code is the authorized code, enabling the client device through a pin coupled to the client device to power on or enable one or more hardware blocks in the client device.

11. The computer-readable storage medium of Concept 1, where the request includes a second challenge for a property of an entire image of the code stored within the client device.

12. The computer-readable storage medium of Concept 1, where the request includes a nonce, and where the verifying correctness of the response includes determining that the response includes information associated with the nonce.

13. The computer-readable storage medium of Concept 1, where the method further includes: sending a second request to the client device, the second request following the request and including a second challenge for a property of a second, different portion of the code of the client device, the second challenge having a second memory address range corresponding to the second portion of the code.

14. The computer-readable storage medium of Concept 13, where the sending the second request is in response to determining that a predetermined period of time lapses after determining that the code is the authorized code.

15. The computer-readable storage medium of Concept 1, where the method further includes: sending a second request to the client device, the second request following the request and including a second challenge for a property of a merged portion of the authorized code that includes at least two different portions of the code, the second challenge having at least two memory address ranges corresponding to the at least two different portions of the code, respectively.

16. The computer-readable storage medium of Concept 1, where the method further includes: sending an individual challenge of a plurality of challenges to the client device for an individual authentication, where the plurality of challenges includes a first number of first challenges associated with a first portion of the code and a second number of second challenges associated with a second portion of the code; and varying at least one of a ratio of the first number and the second number and a sequence of the first challenges and the second challenges.

17. The computer-readable storage medium of Concept 1, where the method further includes: before sending the request, generating a message authentication code (MAC) of the request with a symmetric cryptographic key stored in a secure storage; and transmitting the MAC of the request to the client device.

18. The computer-readable storage medium of Concept 1, where the verifying correctness of the response is in response to determining that a period of time between sending the challenge and receiving the response to the request is smaller than a predetermined threshold.

19. The computer-readable storage medium of Concept 1, where the method further includes: determining that a plurality of requests sent to the client device includes challenges for each of a plurality of portions of the code stored in a secure storage, and in response, sending a request for updating the code stored within the client device.

20. The computer-readable storage medium of Concept 1, where the code of the client device includes a boot code for the client device to start up, and the method further includes resetting the authentication device in synchronization with resetting the client device.

21. The computer-readable storage medium of Concept 1, where the property includes at least one of a digest, a signature, or a message authentication code (MAC).

22. The computer-readable storage medium of Concept 1, where the authentication device includes a secure storage configured to store information associated with the authorized code, and where the information associated with the authorized code stored in the secure storage includes at least one of a copy of the authorized code, a digest of the authorized code, a signature of the authorized code, or a message authentication code (MAC) of the authorized code.

23. The computer-readable storage medium of Concept 1, where the response includes a MAC of a digest of the code generated by the client device based on the digest of the code and a symmetric cryptographic key, and where the method further includes authenticating the response with the symmetric cryptographic key stored in a secure storage.

24. A system including: a client device; and an authentication device coupled to the client device and configured to: send a request to the client device, the request including a challenge for a property of a particular portion from among a plurality of portions of code stored within the client device, the challenge including data indicating a particular memory address range corresponding to the particular portion of the code; receive a response to the request from the client device, the response including information associated with the property of the code, the information being generated by the client device based on the code; verify correctness of the response based on the received information; and based on verifying correctness of the response, determine that the code is an authorized code.

25. The system of Concept 24, where the method further includes: selecting a plurality of memory address ranges for a plurality of portions of the authorized code; determining a respective portion for each selected memory address range; calculating, for each portion of the plurality of portions, a respective digest using a cryptographic hash function; and associating the respective digests with the respective memory address ranges in a secure storage, where the particular memory address range is associated with a particular digest of the particular portion in the secure storage.

26. The system of Concept 25, where the information in the response includes a digest of a portion of the code, and where the verification of the correctness of the response includes determining that the digest of the portion of the code in the response matches with the particular digest of the particular portion of the authorized code stored in the secure storage.

27. The system of Concept 24, where the method further include: in response to determining that the code is the authorized code, enabling the client device to make use of secret data or cryptographic keys stored in a secure storage.

28. The system of Concept 24, where the method further include: in response to determining that the code is the authorized code, enabling the client device through a pin coupled to the client device to power on or enable one or more hardware blocks in the client device.

29. The system of Concept 24, where the method further include: sending a second request to the client device, the second request following the request and including a second challenge for a property of a second, different portion of the code, the second challenge having a second memory address range corresponding to the second portion of the code.

30. The system of Concept 24, where the method further include: sending an individual challenge of a plurality of challenges to the client device for an individual authentication, where the plurality of challenges includes a first number of first challenges associated with a first portion of the code and a second number of second challenges associated with a second portion of the code; and varying at least one of a ratio of the first number and the second number and a sequence of the first challenges and the second challenges.

31. The system of Concept 24, including a secure storage configured to store information of the authorized code, where the property includes at least one of a digest, a signature, or a message authentication code (MAC), and where the information of the authorized code stored in the secure storage includes at least one of a copy of the authorized code, a digest of the authorized code, a signature of the authorized code, or a message authentication code (MAC) of the authorized code.

32. The system of Concept 24, where the authentication device is coupled to a remote host device through a network, and where the host device is configured to provide an entire image of the authorized code to the authentication device and the client device.

33. A method including: sending, by an authentication device, a request to a client device coupled to the authentication device, the request including a challenge for a property of a particular portion from among a plurality of portions of code stored within the client device, the challenge including data indicating a particular memory address range corresponding to the particular portion of the code; receiving, by the authentication device, a response to the request from the client device, the response including information associated with the property of the code; verifying, by the authentication device, correctness of the response based on the received information; and based on verifying correctness of the response, determining, by the authentication device, that the code is an authorized code.

It is noted that the foregoing example concepts are presented for purposes of illustration, and that the present technology is not limited to these example concepts.

Particular embodiments of the subject matter described in this specification can be implemented so as to realize one or more of the following advantages. By using a trusted or secured authentication device to perform controlled secure code authentication for a client device such as a processor, the security of the client device, e.g., a secure boot of the client device, becomes the security of the authentication device. As the authentication device can have security capabilities greater than the client device, security of operations on the client device can be increased and fraudulent operations can be minimized or eliminated. The controlled secure code authentication can ensure that a code running on the client device is an authorized code, e.g., as intended by an OEM, and that malware does not run on the client device. The client device can be made with low security capabilities, e.g., without secure storage against attacks, thus can be made with low cost. The authentication device can use a portion of the authorized code to perform secure code authentication for the client device, thus it works regardless of a size of a code of the client device while allowing a fixed, small amount of memory in the authentication device. The external authentication device can work as an interrogator and provide a method of diversifying the messages on a system bus to complicate any attacks. Moreover, the client device is required to calculate a hash of only a portion of the entire image, the secure code authentication, e.g., for secure boot operation, can be speeded up. The authentication device can have a set of challenges that represent subsets of the downloaded code. Each unique system including an authentication device for a client device can have a different set of address ranges as these will be created at random within the authentication device. So a successful attack on a single system executed by storing the correct partial digests will not be applicable to a subsequent system. The client device can offload various operations on a message to the authentication device. When the authentication device determines that the client device is trustworthy, the authentication device can add a trusted component to the message. The controlled secure code authentication can be applied in different environments, e.g., in a car system, a home network, or a medical device system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A system comprising:
   a client device storing an entire image of a code; and
   an authentication device physically arranged adjacent to the client device and coupled to the client device through a local connection, the authentication device configured to:
   select a plurality of memory address ranges of an authorized code;
   determine a respective portion of the authorized code for each of the plurality memory address ranges;
   calculate a respective property of each of the respective portions;
   send a request to the client device, the request including a challenge for a property of a particular portion from among a plurality of portions of the code stored within the client device, the challenge comprising data indicating a particular memory address range corresponding to the particular portion of the code;
   receive a response to the request from the client device, the response including information associated with the property of the code, the information being generated by the client device based on a portion of the code stored within the client device and comprising the property of the portion of the code;
   verify correctness of the response based on the received information; and
   based on verifying correctness of the response, determine that the entire image of the code stored within the client device is authorized, wherein the verifying correctness of the response comprises determining that the property of the portion of the code in the response matches the property of the particular portion of the authorized code that is obtained based on stored information of the particular portion of the authorized code in a secure storage associated with the authentication device, the stored information of the particular portion of the authorized code comprising the calculated property of the particular portion of the authorized code corresponding to the particular memory address range of the plurality of memory address ranges of the authorized code.

2. The system of claim 1, wherein the authentication device is coupled to a remote host device through a network, and
wherein the remote host device is configured to provide an entire image of the authorized code to the authentication device and the client device.

3. The system of claim 1, wherein the local connection comprises a data cable, a wireless connection, a hardware interface, a conductor, or a conductive connection on a circuit board.

4. The system of claim 1, wherein the code comprises at least one of a boot code for the client device to boot and an operation code for the client device to perform a corresponding operation.

5. A non-transitory computer-readable storage medium having instructions stored thereon which, when executed by one or more processors, cause the one or more processors to perform a method comprising:
selecting, by an authentication device, a plurality of memory address ranges of an authorized code;
determining, by the authentication device, a respective portion of the authorized code for each of the plurality memory address ranges;
calculating, by the authentication device, a respective property of each of the respective portions;
sending, from the authentication device, a request to a client device coupled to the authentication device, the request including a challenge for a property of a particular portion from among a plurality of portions of an entire image of a code stored within the client device, the challenge comprising data indicating a particular memory address range corresponding to the particular portion of the code, the authentication device being physically arranged adjacent to the client device and coupled to the client device through a local connection;
receiving, at the authentication device, a response to the request from the client device, the response including information associated with the property of a portion of the code stored within the client device;
verifying correctness of the response based on the received information; and
based on verifying correctness of the response, determining that the entire image of the code stored within the client device is authorized,
wherein the verifying correctness of the response comprises determining that the property of the portion of the code in the response matches the property of the particular portion of the authorized code that is obtained based on stored information of the particular portion of the authorized code in a secure storage associated with the authentication device, the stored information of the particular portion of the authorized code comprising the calculated property of the particular portion of the authorized code corresponding to the particular memory address range of the plurality of memory address ranges of the authorized code.

6. The computer-readable storage medium of claim 5, wherein the method further includes:
storing first information indicative of the respective properties of the portions of the authorized code and second information indicative of the respective memory address ranges in the secure storage; and
respectively associating memory address ranges from among the plurality of memory address ranges with properties from among the properties of the portions in the secure storage.

7. The computer-readable storage medium of claim 6, wherein the selecting the plurality of memory address ranges of the authorized code comprises:
randomly selecting the plurality of memory address ranges from a range defined by a starting address of the authorized code and an ending address of the authorized code.

8. The computer-readable storage medium of claim 6, wherein the method further comprises:
randomly selecting the particular memory address range from among the plurality of memory address ranges, the particular memory address range being associated with a particular property of the particular portion of the authorized code in the secure storage.

9. The computer-readable storage medium of claim 5, wherein the method further includes:
receiving an entire image of the authorized code;
receiving a signature associated with the authorized code;
calculating a digest of the received entire image of the authorized code; and
verifying authenticity of the received entire image based on the received signature and the calculated digest of the received entire image.

10. The computer-readable storage medium of claim 5, wherein the method further includes:
receiving a second entire image of the authorized code;
selecting randomly a plurality of second address ranges of the second entire image of the authorized code;
determining a respective second portion of the authorized code for each second address range;
calculating a respective second property of each determined second portion of the authorized code; and
replacing the respective properties of the portions of the authorized code with the respective second properties of the second portions of the authorized code in the secure storage.

11. The computer-readable storage medium of claim 5, wherein the method further includes:
in response to determining that the code is the authorized code, enabling the client device to use secret data or cryptographic keys stored in the secure storage.

12. The computer-readable storage medium of claim 5, wherein the method further comprises:
in response to determining that the code is the authorized code, enabling the client device through a pin coupled to the client device to power on or enable one or more hardware blocks in the client device.

13. The computer-readable storage medium of claim 5, wherein the request includes a second challenge for a property of an entire image of the code stored within the client device.

14. The computer-readable storage medium of claim 5, wherein the request includes a nonce, and wherein the verifying correctness of the response comprises determining that the response includes information associated with the nonce.

15. The computer-readable storage medium of claim 5, wherein the method further comprises:
sending a second request to the client device, the second request following the request and including a second challenge for a property of a second, different portion of the code of the client device, the second challenge comprising data indicating a second memory address range corresponding to the second portion of the code.

16. The computer-readable storage medium of claim 15, wherein the sending the second request is in response to determining that a predetermined period of time lapses after determining that the code is the authorized code.

17. The computer-readable storage medium of claim 5, wherein the method further comprises:
sending a second request to the client device, the second request following the request and comprising a second challenge for a property of a merged portion of the authorized code that includes at least two different portions of the code, the second challenge comprising data indicating at least two memory address ranges corresponding to the at least two different portions of the code, respectively.

18. The computer-readable storage medium of claim 5, wherein the method further comprises:
sending an individual challenge of a plurality of challenges to the client device for an individual authentication, wherein the plurality of challenges includes a first number of first challenges associated with a first portion of the code and a second number of second challenges associated with a second portion of the code; and
varying at least one of a ratio of the first number and the second number and a sequence of the first challenges and the second challenges.

19. The computer-readable storage medium of claim 5, wherein the method further comprises:
before sending the request, generating a message authentication code (MAC) of the request with a symmetric cryptographic key stored in the secure storage; and
transmitting the MAC of the request to the client device.

20. The computer-readable storage medium of claim 5, wherein the verifying correctness of the response is in response to
determining that a period of time between sending the challenge and receiving the response to the request is smaller than a predetermined threshold.

21. The computer-readable storage medium of claim 5, wherein the method further comprises:
determining that a plurality of requests sent to the client device includes challenges for each of the plurality of portions of the code stored in the secure storage, and in response,
sending a request for updating the code stored within the client device.

22. The computer-readable storage medium of claim 5, wherein the code of the client device includes a boot code for the client device to start up, and
the method further comprises resetting the authentication device in synchronization with resetting the client device.

23. The computer-readable storage medium of claim 5, wherein the property includes at least one of a digest, a signature, or a message authentication code (MAC).

24. The computer-readable storage medium of claim 5, wherein the authentication device comprises the secure storage configured to store information associated with the authorized code, and
wherein the information associated with the authorized code stored in the secure storage comprises at least one of a copy of the authorized code, a digest of the authorized code, a signature of the authorized code, or a message authentication code (MAC) of the authorized code.

25. The computer-readable storage medium of claim 5, wherein the response includes a MAC of a digest of the code generated by the client device based on the digest of the code and a symmetric cryptographic key, and
wherein the method further comprises authenticating the response with the symmetric cryptographic key stored in the secure storage.

26. A method comprising:
selecting, by an authentication device, a plurality of memory address ranges of an authorized code;
determining, by the authentication device, a respective portion of the authorized code for each of the plurality memory address ranges;
calculating, by the authentication device, a respective property of each of the respective portions;
sending, by the authentication device, a request to a client device coupled to the authentication device, the request including a challenge for a property of a particular portion from among a plurality of portions of an entire image of a code stored within the client device, the challenge comprising data indicating a particular memory address range corresponding to the particular portion of the code, the authentication device being physically arranged adjacent to the client device and coupled to the client device through a local connection;
receiving, by the authentication device, a response to the request from the client device, the response including information associated with the property of a portion of the code stored within the client device;
verifying, by the authentication device, correctness of the response based on the received information; and
based on verifying correctness of the response, determining, by the authentication device, that the entire image of the code stored within the client device is authorized,
wherein the verifying correctness of the response comprises determining that the property of the portion of the code in the response matches the property of the particular portion of the authorized code that is obtained based on stored information of the particular portion of the authorized code in a secure storage associated with the authentication device, the stored information of the particular portion of the authorized code comprising the calculated property of the particular portion of the authorized code corresponding to the particular memory address range of the plurality of memory address ranges of the authorized code.

* * * * *